(12) United States Patent
Lee et al.

(10) Patent No.: US 7,662,517 B2
(45) Date of Patent: Feb. 16, 2010

(54) ORGANIC/INORGANIC COMPOSITE MICROPOROUS MEMBRANE AND ELECTROCHEMICAL DEVICE PREPARED THEREBY

(75) Inventors: Sang Young Lee, Daejeon (KR); Seok Koo Kim, Daejeon (KR); Jung Don Suk, Daejeon (KR); Hyun Hang Yong, Seoul (KR); Jang Hyuk Hong, Daejeon (KR); Soon Ho Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 155 days.

(21) Appl. No.: 11/721,259

(22) PCT Filed: Dec. 22, 2005

(86) PCT No.: PCT/KR2005/004450

§ 371 (c)(1),
(2), (4) Date: Jun. 8, 2007

(87) PCT Pub. No.: WO2006/068428

PCT Pub. Date: Jun. 29, 2006

(65) Prior Publication Data
US 2009/0111025 A1    Apr. 30, 2009

(30) Foreign Application Priority Data
Dec. 22, 2004  (KR) ..................... 10-2004-0110400
Dec. 22, 2004  (KR) ..................... 10-2004-0110402

(51) Int. Cl.
*H01M 2/16*  (2006.01)
*H01M 4/62*  (2006.01)
*H01M 2/14*  (2006.01)
*H01M 4/82*  (2006.01)
*H01M 6/00*  (2006.01)

(52) U.S. Cl. ...................... 429/247; 429/129; 429/232; 29/623.1; 29/623.5
(58) Field of Classification Search ................. 429/247, 429/232, 129; 29/623.1, 623.5
See application file for complete search history.

(56) References Cited

U.S. PATENT DOCUMENTS 6,432,586 B1    8/2002    Zhang (Continued)

FOREIGN PATENT DOCUMENTS

JP        2001319634        11/2001

(Continued)

OTHER PUBLICATIONS

Written Opinion dated Apr. 7, 2006 for Application No. PCT/KR2005-004450.

(Continued)

*Primary Examiner*—Patrick Ryan
*Assistant Examiner*—Julian Mercado
(74) *Attorney, Agent, or Firm*—Birch, Stewart, Kolasch & Birch, LLP

(57) ABSTRACT

Disclosed is an organic/inorganic composite porous separator comprising: (a) a polyolefin-based separator substrate; and (b) an active layer formed by coating at least one region selected from the group consisting of a surface of the substrate and a part of pores present in the substrate with a mixture of inorganic particles and a binder polymer, wherein the inorganic particles in the active layer are interconnected among themselves and are fixed by the binder polymer, and interstitial volumes among the inorganic particles form a pore structure. A method for manufacturing the same separator and an electrochemical device including the same separator are also disclosed. An electrochemical device comprising the organic/inorganic composite porous separator shows improved thermal and electrochemical safety and quality, simultaneously.

18 Claims, 6 Drawing Sheets

U.S. PATENT DOCUMENTS

2002/0119374 A1 8/2002 Yang et al.
2002/0187401 A1 12/2002 Lee et al.
2003/0104273 A1 6/2003 Lee et al.
2004/0214089 A1* 10/2004 Lee et al. .................... 429/309

FOREIGN PATENT DOCUMENTS

KR 1020010095623 7/2001

OTHER PUBLICATIONS

International Search Report dated Apr. 7, 2007 for Application No. PCT/KR2005-004450 (All references cited in Search Report are listed above).

* cited by examiner

＃ ORGANIC/INORGANIC COMPOSITE MICROPOROUS MEMBRANE AND ELECTROCHEMICAL DEVICE PREPARED THEREBY

TECHNICAL FIELD

The present invention relates to a novel organic/inorganic composite porous separator that can show excellent thermal safety, electrochemical safety and lithium ion conductivity and a high degree of swelling with electrolyte, compared to conventional polyolefin-based separators, and an electrochemical device comprising the same, which ensures safety and has improved quality.

BACKGROUND ART

Recently, there is increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention.

Among the currently used secondary batteries, lithium secondary batteries, developed in early 1990's, have a drive voltage and an energy density higher than those of conventional batteries using aqueous electrolytes (such as Ni-MH batteries, Ni—Cd batteries and $H_2SO_4$—Pb batteries), and thus are spotlighted in the field of secondary batteries. However, lithium secondary batteries have problems related to their safety, due to ignition and explosion caused by the use of organic electrolytes, and are manufactured by a complicated process. Lithium ion polymer batteries, appearing more recently, solve the above-mentioned disadvantages of secondary lithium ion batteries, and thus become one of the most potent candidates of next generation batteries. However, such secondary lithium ion polymer batteries still have low capacity compared to secondary lithium ion batteries. Particularly, they show insufficient discharge capacity at low temperature. Hence, there is an imminent need for the improvement of secondary lithium ion batteries.

A lithium ion battery is manufactured by coating a cathode active material (e.g. $LiCoO_2$) and an anode active material (e.g. graphite), which have crystal structures including interstitial volumes, onto the corresponding current collector (i.e. aluminum foil and copper foil, respectively) to provide a cathode and an anode. Then, a separator is interposed between both electrodes to form an electrode assembly, and an electrolyte is injected into the electrode assembly. During a charge cycle of the battery, lithium intercalated into the crystal structure of the cathode active material is deintercalated, and then intercalated into the crystal structure of the anode active material. On the other hand, during a discharge cycle, lithium intercalated into the anode active material is deintercalated again, and then intercalated back into the crystal structure of the cathode. As charge/discharge cycles are repeated, lithium ions reciprocate between the cathode and the anode. In this regard, a lithium ion battery is also referred to as a rocking chair battery.

Such batteries have been produced by many battery producers. However, most lithium secondary batteries have different safety characteristics depending on several factors. Evaluation of and security in safety of batteries are very important matters to be considered. Particularly, users should be protected from being damaged by malfunctioning batteries. Therefore, safety of batteries is strictly restricted in terms of ignition and combustion of batteries by safety standards.

Many attempts have been made to solve the problem related to the safety of a battery. However, ignition of a battery, caused by a forced internal short circuit due to external impacts (particularly, in the case of a customer-abused battery) cannot be solved yet.

Recently, U.S. Pat. No. 6,432,586 discloses a polyolefin-based separator coated with an inorganic layer such as calcium carbonate, silica, etc., so as to prevent an internal short circuit, caused by dendrite growth inside of a battery. However, the polyolefin-based separator merely using conventional inorganic particles cannot provide significant improvement in the safety of a battery, when the battery experiences an internal short circuit due to external impacts. There is no mechanism for preventing such problem in the separator. Additionally, the inorganic particle layer disclosed in the above patent is not particularly defined in terms of the thickness, pore size and porosity. Moreover, the inorganic particles used in the separator have no lithium conductivity, and thus cause a significant drop in the quality of a battery.

BRIEF DESCRIPTION OF THE DRAWINGS

The foregoing and other objects, features and advantages of the present invention will become more apparent from the following detailed description when taken in conjunction with the accompanying drawings in which:

FIG. 2a and FIG. 2b are photographs taken by a Scanning Electron Microscope (SEM) showing the organic/inorganic composite porous separator (PVdF-CTFE/$BaTiO_3$) according to Example 1, wherein FIG. 2a and FIG. 2b show the active layer and separator substrate, respectively;

FIG. 5a and FIG. 5b are photographs showing the results for a heat shrinking test of separators, wherein FIG. 5a and FIG. 5b show a currently used PE separator, and the organic/inorganic composite porous separator (PVdF-CTFE/$BaTiO_3$) according to Example 1, respectively, after each of the separators is maintained at 150° C. for 1 hour;

FIG. 6a and FIG. 6b are photographs showing the results for a pseudo internal short circuit test of separators, wherein FIG. 6a and FIG. 6b show a currently used PE separator, and the organic/inorganic composite porous separator (PVdF-CTFE/$BaTiO_3$) according to Example 1, respectively;

FIG. 8a and FIG. 8b are photographs showing the results for the battery safety test, after local crush that causes an artificial internal short circuit, wherein FIG. 8a and FIG. 8b show the currently used PE separator according to Comparative Example 1 and the organic/inorganic composite porous separator (PVdF-CTFE/BaTiO$_3$) according to Example 1, respectively; and FIG. 9a and FIG. 9b are graphs showing the results for the safety test of batteries after overcharge, wherein FIG. 9a and FIG. 9b show the currently used PE separator according to Comparative Example 1 and the organic/inorganic composite porous separator (PVdF-CTFE/BaTiO$_3$) according to Example 1, respectively.

DISCLOSURE OF THE INVENTION

Figure 1:
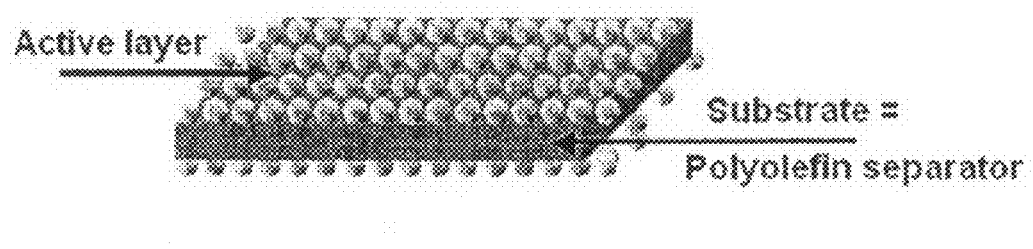
FIG. 1 is a schematic view showing an organic/inorganic composite porous separator according to the present invention, and the function thereof in a battery.

The present inventors have found that an organic/inorganic composite porous separator, formed by using (1) a polyolefin-based separator substrate, (2) inorganic particles and (3) a binder polymer, improves thermal safety of a conventional polyolefin-based separator. Additionally, we have found that because the organic/inorganic composite porous separator has pore structures present both in the polyolefin-based separator substrate and in an active layer formed of the inorganic particles and the binder polymer coated on the separator substrate, it provides an increased volume of space, into which a liquid electrolyte infiltrates, resulting in improvements in lithium ion conductivity and degree of swelling with electrolyte. Therefore, the organic/inorganic composite porous separator can improve the quality and safety of an electrochemical device using the same as a separator.

We have also found that when inorganic particles having piezoelectricity derived from a high dielectric constant and/or inorganic particles having lithium ion conductivity are used as the inorganic particles that form the active layer, it is possible to prevent a complete short circuit between both electrodes by the inorganic particles, even if the separator in a battery is broken due to external impacts. It is also possible to solve the problem related to safety, such as explosion of a battery, by reducing the voltage of a battery gradually due to the flow of electric current, caused by the lithium conductivity and/or piezoelectricity of the inorganic particles.

Therefore, it is an object of the present invention to provide an organic/inorganic composite porous separator, a method for manufacturing the same and an electrochemical device comprising the same.

According to an aspect of the present invention, there is provided an organic/inorganic composite porous separator, which comprises (a) a polyolefin-based separator substrate; and (b) an active layer formed by coating at least one region selected from the group consisting of a surface of the substrate and a part of pores present in the substrate with a mixture of inorganic particles and a binder polymer, wherein the inorganic particles in the active layer are interconnected among themselves and are fixed by the binder polymer, and interstitial volumes among the inorganic particles form a pore structure. There is also provided an electrochemical device (preferably, a lithium secondary battery) comprising the same.

According to another aspect of the present invention, there is provided a method for manufacturing an organic/inorganic composite porous separator, which includes the steps of: (a) dissolving a binder polymer into a solvent to form a polymer solution; (b) adding inorganic particles having lithium ion conductivity to the polymer solution obtained from step (a) and mixing them; and (c) coating the mixture of inorganic particles with a binder polymer obtained from step (b) onto at least one region selected from the group consisting of a surface of the substrate and a part of the pores present in the substrate, followed by drying.

Hereinafter, the present invention will be explained in more detail.

The present invention is characterized by providing a novel organic/inorganic composite porous separator, which shows excellent thermal safety, electrochemical safety and lithium ion conductivity, and a high degree of swelling with electrolyte, compared to a polyolefin-based separator currently used as a separator for batteries.

The organic/inorganic composite porous separator is obtained by coating an active layer comprising inorganic particles and a binder polymer on a polyolefin-based separator substrate. Herein, the pores present in the separator substrate itself and a uniform pore structure formed in the active layer by the interstitial volumes among the inorganic particles permit the organic/inorganic composite porous separator to be used as a separator. Additionally, if a polymer capable of being gelled when swelled with a liquid electrolyte is used as the binder polymer component, the organic/inorganic composite porous separator can serve also as an electrolyte.

Particular characteristics of the organic/inorganic composite porous separator are as follows.

(1) Conventional composite separators, formed by coating inorganic particles or a mixture of inorganic particles and a binder polymer onto a conventional polyolefin separator have no pore structure or, if any, have an irregular pore structure having a pore size of several angstroms. Therefore, they cannot serve sufficiently as spacers, through which lithium ions can pass (see FIG. 3). Additionally, in order to form a microporous structure, most of such conventional separators are subjected to extraction with a plasticizer so that a microporous structure can be formed in a gel type polymer electrolyte, resulting in degradation in the quality of a battery.

Figure 2:
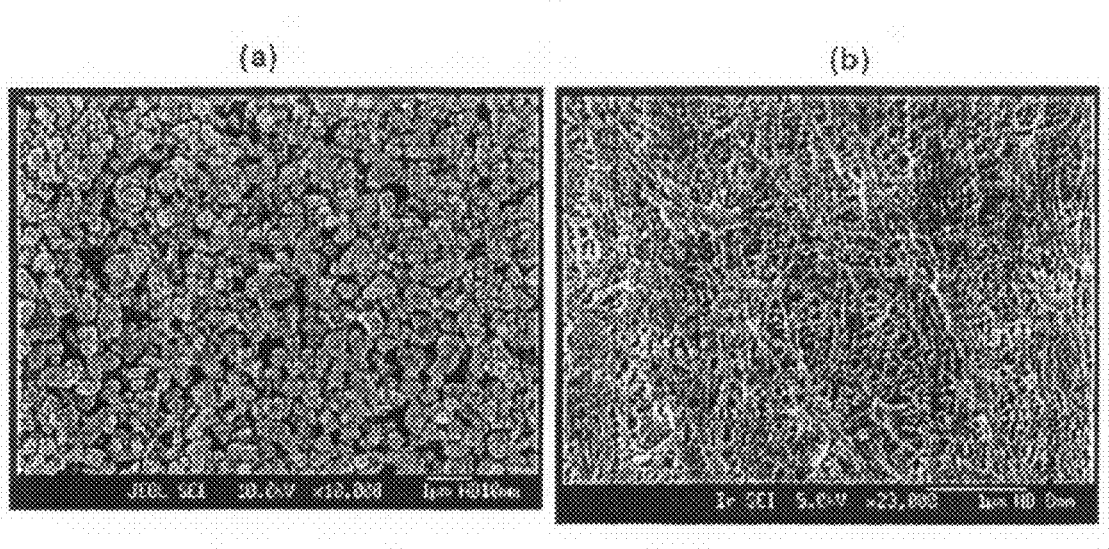
Figure 3:
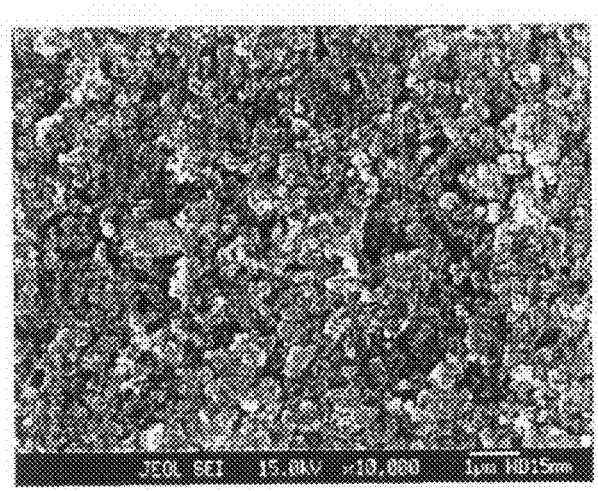
FIG. 3 is a photograph taken by SEM showing the composite separator according to Comparative Example 2, wherein the composite separator comprises inorganic particles and a polymer, the polymer being present in a higher proportion than the inorganic particles.

On the contrary, the organic/inorganic composite porous separator according to the present invention has uniform pore structures both in the active layer and the polyolefin-based separator substrate, as shown in FIGS. 2 and 3, and the pore structures permit lithium ions to move smoothly therethrough. Therefore, it is possible to introduce a large amount of electrolyte through the pore structures, so as to obtain a high degree of swelling with electrolyte, resulting in improvement in the quality of a battery.

Figure 5:
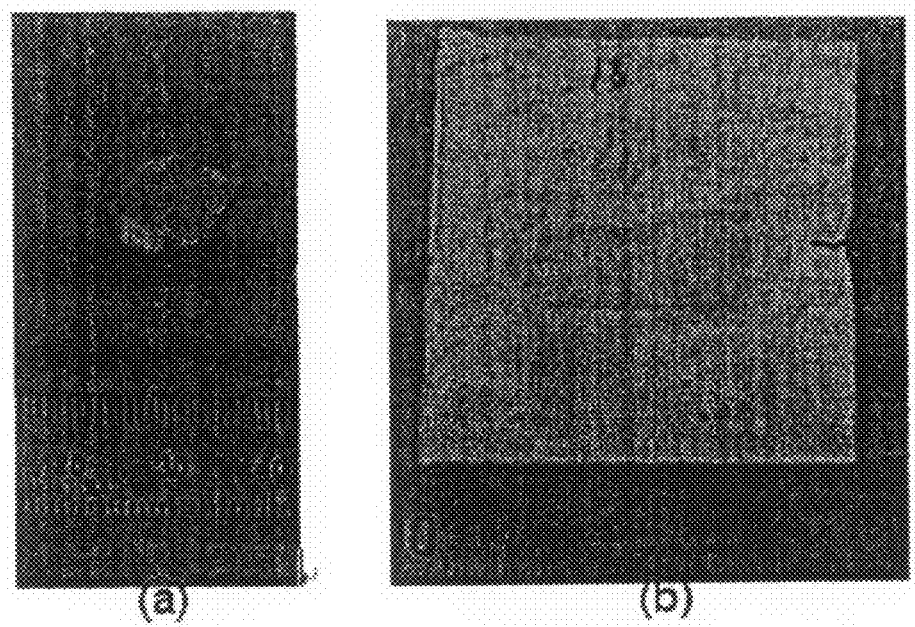

(2) Although conventional polyolefin-based separators cause heat shrinking at high temperature because they have a melting point of 120-140° C. (see FIG. 5a), the organic/inorganic composite porous separator, comprising the inorganic particles and the binder polymer, does not cause heat shrinking due to the heat resistance of the inorganic particles (see FIG. 5b). Therefore, an electrochemical device using the above organic/inorganic composite porous separator prevents a complete internal short circuit between a cathode and an anode by the organic/inorganic composite porous active layer, even when the separator is broken under extreme conditions caused by internal or external factors, such as high temperature, overcharge, external impacts, etc. Even if a short circuit occurs, the region of short circuit can be inhibited from extending throughout the battery. As a result, it is possible to significantly improve the safety of a battery.

(3) Conventional separators or polymer electrolytes are formed in the shape of free standing films and then assembled together with electrodes. On the contrary, the organic/inorganic composite porous separator according to the present invention is formed by coating the active layer directly on the surface of a polyolefin-based separator substrate, so that the pores on the surface of the polyolefin-based separator substrate and the active layer can be anchored to each other, thereby providing a firm physical bonding between the active layer and the porous substrate. Therefore, problems related to mechanical properties such as brittleness can be improved. Additionally, such increased interfacial adhesion between the porous substrate and the active layer can decrease the interfacial resistance. In fact, the organic/inorganic composite porous film according to the present invention includes the organic/inorganic composite active layer bonded organically to the polyolefin-based separator substrate. Additionally, the active layer does not affect the pore structure present in the polyolefin-based substrate, so that the structure can be maintained. Further, the active layer itself has a uniform pore structure formed by the inorganic particles (see FIGS. 2 and 3). Because the above-mentioned pore structures are filled with a liquid electrolyte injected subsequently, interfacial resistance generated among the inorganic particles or between the inorganic particles and the binder polymer can be decreased significantly.

(4) Polyolefin-based separators coated with a layer comprising a metal oxide or a mixture of a metal oxide with a polymer have been disclosed according to the prior art. However, most of such conventional separators comprise no binder polymer for supporting and interconnecting inorganic particles. Even if a polymer is used in such conventional separators, the polymer should have been used in a great amount, so that such conventional separators have no pore structures or have a non-uniform pore region in the polymer, and thus cannot serve sufficiently as separators, through which lithium ions can pass (see, FIG. 4). Additionally, there is no correct understanding with regard to the physical properties, particle diameter and homogeneity of the inorganic particles and a pore structure formed by the inorganic particles. Therefore, such separators according to the prior art have a problem in that they cause degradation in the quality of a battery. More particularly, when the inorganic particles have a relatively large diameter, the thickness of an organic/inorganic coating layer obtained under the same solid content increases, resulting in degradation in mechanical properties. Additionally, in this case, there is a great possibility of internal short circuit during charge/discharge cycles of a battery due to an excessively large pore size. Further, due to the lack of a binder that serves to fix the inorganic particles on the substrate, a finally formed film is deteriorated in terms of mechanical properties, and is not suitable to be applied in a practical battery assemblage process. For example, conventional separators according to the prior art may not be amenable to a lamination process.

On the contrary, the present inventors have recognized that controlling the porosity and pore size of the organic/inorganic composite porous separator is one of the factors affecting the quality of a battery. Therefore, we have varied and optimized the particle diameter of the inorganic particles or the mixing ratio of the inorganic particles with the binder polymer. In fact, it was shown by the following Experimental Examples that the organic/inorganic composite porous separator according to the present invention, which comprises a pore structure formed by the interstitial volumes among the inorganic particles on the polyolefin-based separator substrate, has a significantly higher ion conductivity, as compared to a conventional composite separator having an artificial pore structure formed in a polymer film on the polyolefin-based separator substrate (see FIG. 4). Additionally, according to the present invention, the binder polymer used in the active layer can serve sufficiently as a binder so as to interconnect and stably fix the inorganic particles among themselves, between the inorganic particles and the surface of the heat resistant porous substrate, and between the inorganic particles and a part of the pores in the substrate, thereby preventing degradation in mechanical properties of a finally formed organic/inorganic composite porous separator.

(5) The organic/inorganic composite porous separator according to the present invention can provide excellent adhesion by controlling the mixing ratio of the components forming the active layer, i.e. the mixing ratio of the inorganic particles with the binder polymer. Therefore, it is possible to facilitate assemblage of a battery.

In the organic/inorganic composite porous film according to the present invention, one component present in the active layer formed on the surface of the polyolefin-based separator substrate or on a part of the pores in the substrate is inorganic particles currently used in the art. The inorganic particles permit an interstitial volume to be formed among them, thereby serving to form micropores and to maintain the physical shape as a spacer. Additionally, because the inorganic particles are characterized in that their physical properties are not changed even at a high temperature of 200° C. or higher, the organic/inorganic composite porous separator using the inorganic particles can have excellent heat resistance.

There is no particular limitation in the inorganic particles, as long as they are electrochemically stable. In other words, there is no particular limitation in the inorganic particles that may be used in the present invention, as long as they are not subjected to oxidation and/or reduction at the range of drive voltages (for example, 0~5 V based on $Li/Li^+$) of a battery, to which they are applied. Particularly, it is preferable to use inorganic particles having ion conductivity as high as possible, because such inorganic particles can improve ion conductivity and quality in an electrochemical device. Additionally, when inorganic particles having a high density are used, they have a difficulty in dispersion during a coating step and may increase the weight of a battery to be manufactured. Therefore, it is preferable to use inorganic particles having a density as low as possible. Further, when inorganic particles having a high dielectric constant are used, they can contribute to increase the dissociation degree of an electrolyte salt in a liquid electrolyte, such as a lithium salt, thereby improving the ion conductivity of the electrolyte.

For these reasons, it is preferable to use inorganic particles having a high dielectric constant of 5 or more, preferably of 10 or more, inorganic particles having lithium conductivity, inorganic particles having piezoelectricity, or mixtures thereof.

In general, a material having piezoelectricity means one, which is an insulator under normal pressure, but allows current flow due to the change of its internal structure, when a certain range of pressure is applied thereto. The inorganic particles having piezoelectricity show a high dielectric constant of 100 or more. They are charged positively on one surface while being charged negatively on the other surface, when they are drawn or compressed under the application of a certain range of pressure. Hence, the inorganic particles having piezoelectricity cause an electric potential difference between both surfaces thereof.

When the inorganic particles having the above characteristics are used in the porous active layer, a cathode and an anode are prevented from being in direct contact with each other by the inorganic particles coated on the separator, when an internal short circuit occurs between both electrodes due to external impacts such as local crush, a nail, or the like. Additionally, as shown in FIG. 1, such piezoelectricity of the inorganic particles can permit generation of a potential difference in the particles, thereby allowing electron movements, i.e. minute flow of electric current between both electrodes. Therefore, it is possible to accomplish a slow decrease in the voltage of a battery and to improve the safety of a battery (see FIG. 7). Heretofore, separators coated with conventional inorganic particles could prevent explosion of a battery due to the inorganic particles, when an internal short circuit occurred between both electrodes by external impacts. However, in the case of a battery using such conventional separators, the battery is present practically in a state of latent danger, because it is internally damaged but maintains the potential between both electrodes due to the lack of the electroconductivity of the inorganic particles. Thus, the battery may have a possibility of ignition or explosion with time, or when a secondary impact is applied thereto. In the organic/inorganic composite porous separator according to the present invention, the above-mentioned problems can be solved satisfactorily. Particular non-limiting examples of the inorganic particles having piezoelectricity include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), or mixtures thereof.

As used herein, "inorganic particles having lithium ion conductivity" refer to inorganic particles containing lithium elements and having a capability of conducting lithium ions without storing lithium. Inorganic particles having lithium ion conductivity can conduct and move lithium ions due to defects present in their structure, and thus can improve lithium ion conductivity of a battery and contribute to improve the quality of a battery. Non-limiting examples of such inorganic particles having lithium ion conductivity include: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitrides($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, or mixtures thereof.

Additionally, particular non-limiting examples of the inorganic particles having a dielectric constant of 5 or more include $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or mixtures thereof. Combination of the inorganic particles having a high dielectric constant, the inorganic particles having piezoelectricity and the inorganic particles having lithium ion conductivity can provide a synergic effect.

It is possible to form the pore structure of the active layer in addition to the pores present in the separator substrate by controlling the size of inorganic particles, content of inorganic particles and the mixing ratio of inorganic particles and binder polymer. It is also possible to control the pore size as well as the porosity.

Although there is no particular limitation in the size of inorganic particles, inorganic particles preferably have a size of 0.001~10 μm for the purpose of forming a film having a uniform thickness and providing a suitable porosity. If the size is less than 0.001 μm, inorganic particles have poor dispersibility so that physical properties of the organic/inorganic composite porous separator cannot be controlled with ease. If the size is greater than 10 μm, the resultant organic/inorganic composite porous separator has an increased thickness under the same solid content, resulting in degradation in mechanical properties. Furthermore, such excessively large pores may increase a possibility of internal short circuit being generated during repeated charge/discharge cycles.

There is no particular limitation in the content of the inorganic particles. However, the inorganic particles are present in the mixture of the inorganic particles with the binder polymer forming the organic/inorganic composite porous separator, preferably in an amount of 50~99 wt %, more particularly in an amount of 60~95 wt % based on 100 wt % of the total weight of the mixture. If the content of the inorganic particles is less than 50 wt %, the binder polymer is present in such a large amount as to decrease the interstitial volumes formed among the inorganic particles and thus to decrease the pore size and porosity, resulting in degradation in the quality of a battery. If the content of the inorganic particles is greater than 99 wt %, the polymer content is too low to provide sufficient adhesion among the inorganic particles, resulting in degradation in mechanical properties of a finally formed organic/inorganic composite porous separator.

In the organic/inorganic composite porous separator according to the present invention, another component present in the active layer formed on the surface of the polyolefin-based separator substrate or on a part of the pores in the substrate is a binder polymer currently used in the art. The binder polymer preferably has a glass transition temperature ($T_g$) as low as possible, more preferably $T_g$ between $-200°$ C. and $200°$ C. Binder polymers having a low $T_g$ as described above are preferred, because they can improve mechanical properties such as flexibility and elasticity of a finally formed separator. The polymer serves as a binder that interconnects and stably fixes the inorganic particles among themselves, between the inorganic particles and the surface of the separator substrate, and a part of the pores present in the separator, and thus prevents degradation in mechanical properties of a finally formed organic/inorganic composite porous separator.

When the binder polymer has ion conductivity, it can further improve the quality of an electrochemical device. However, it is not essential to use a binder polymer having ion conductivity. Therefore, the binder polymer preferably has a dielectric constant as high as possible. Because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the binder polymer may range from 1.0 to 100 (as measured at a frequency of 1 kHz), and is preferably 10 or more.

In addition to the above-described functions, the binder polymer used in the present invention may be further characterized in that it is gelled when swelled with a liquid electrolyte, and thus shows a high degree of swelling. In fact, when the binder polymer is a polymer having a high degree of swelling with an electrolyte, the electrolyte injected after the assemblage of a battery infiltrates into the polymer, and the polymer containing the electrolyte infiltrated into the same also has electrolyte ion conductivity. Hence, it is possible to improve the quality of an electrochemical device compared to conventional organic/inorganic composite electrolytes. Additionally, the organic/inorganic composite porous separator according to the present invention has improved wettability with an electrolyte for a battery compared to conventional hydrophobic polyolefin-based separators, and allows the use of a polar electrolyte for a battery, which cannot be applied in conventional batteries. Further, when the binder polymer is a polymer that can be gelled when swelled with an electrolyte, the polymer can react with an electrolyte injected subsequently into a battery, and thus can be gelled to form a gel type organic/inorganic composite electrolyte. The electrolyte formed as described above is obtained with ease and shows high ion conductivity and a high degree of swelling with an electrolyte, compared to conventional gel type electrolytes, thereby contributing to the improvement in the quality of a battery. Therefore, it is preferable to use a polymer having a solubility parameter between 15 and 45 $MPa^{1/2}$, more preferably between 15 and 25 $MPa^{1/2}$, and between 30 and 45 $MPa^{1/2}$. If the binder polymer has a solubility parameter of less than 15 $Mpa^{1/2}$ or greater than 45 $Mpa^{1/2}$, it has difficulty in swelling with a conventional liquid electrolyte for a battery.

Non-limiting examples of the binder polymer that may be used in the present invention include polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide or mixtures thereof. Other materials may be used alone or in combination, as long as they satisfy the above characteristics.

Although there is no particular limitation in the mixing ratio of the inorganic particles with the binder polymer, which form the active layer, the mixing ratio can be controlled in the range of 10:90~99:1 (wt % basis), and a preferred mixing ratio is 80:20~99:1 (wt % basis). If the mixing ratio is less than 10:90 (wt % basis), the polymer content is excessively high, so that the pore size and porosity are reduced due to a decrease in interstitial volumes formed among the inorganic particles, resulting in degradation in the quality of a battery. If the mixing ratio is greater than 99:1 (wt % basis), the polymer content is too low to provide sufficient adhesion among the inorganic particles, resulting in degradation in mechanical properties of a finally formed organic/inorganic composite porous separator.

The organic/inorganic composite porous separator may further comprise additives other than the inorganic particles and binder polymer as still another component of the active layer.

In the organic/inorganic composite porous separator according to the present invention, the substrate coated with the mixture of inorganic particles and binder polymer, which forms the active layer, is a polyolefin-based separator currently used in the art. Non-limiting examples of the polyolefin-based separator that may be used in the present invention include high density polyethylene, linear low density polyethylene, low density polyethylene, ultrahigh molecular weight polyethylene, polypropylene or derivatives thereof.

Although there is no particular limitation in the thickness of the polyolefin-based separator substrate, the substrate preferably has a thickness between 1 µm and 100 µm, more preferably between 5 µm and 50 µm. If the substrate has a thickness of less than 1 µm, it is difficult to maintain mechanical properties. If the substrate has a thickness of greater than 100 µm, it may function as a resistance layer.

Although there is no particular limitation in the pore size and porosity of the polyolefin-based separator substrate, the substrate preferably has a porosity between 10% and 95%. The pore size (diameter) preferably ranges from 0.1 µm to 50 µm. When the pore size and porosity are less than 0.1 µm and 10%, respectively, the substrate may function as a resistance layer. When the pore size and porosity are greater than 50 µm and 95%, respectively, it is difficult to maintain mechanical properties. Additionally, the polyolefin-based separator substrate may be provided in the form of fibers or a membrane.

As described above, the organic/inorganic composite porous separator formed by coating the mixture of inorganic particles with binder polymer onto the polyolefin-based separator substrate has pores contained in the separator substrate itself and forms pore structures in the substrate as well as in the active layer due to the interstitial volumes among the inorganic particles, formed on the substrate. The pore size and porosity of the organic/inorganic composite porous separator mainly depend on the size of inorganic particles. For example, when inorganic particles having a particle diameter of 1 µm or less are used, pores formed thereby also have a size of 1 µm or less. The pore structure is filled with an electrolyte injected subsequently and the electrolyte serves to conduct ions. Therefore, the size and porosity of the pores are important factors in controlling the ion conductivity of the organic/inorganic composite porous separator.

There is no particular limitation in the thickness of the active layer having a pore structure, which is formed by coating the above mixture onto the polyolefin separator substrate. The active layer preferably has a thickness between 0.01 and 100 µm. Additionally, the pores size and porosity of the active layer preferably range from 0.001 to 10 µm and from 5 to 95%, respectively. However, the scope of the present invention is not limited to the above ranges.

Preferably, the pore size and porosity of a finally formed organic/inorganic composite porous separator according to the present invention are 0.001 to 10 µm and from 5 to 95%, respectively. Additionally, there is no particular limitation in the thickness of the finally formed organic/inorganic composite porous separator according to the present invention, and the thickness can be controlled under the consideration of the quality of a battery. The organic/inorganic composite porous separator according to the present invention has a thickness preferably of 1~100 µm, more preferably of 1~30 µm.

The organic/inorganic composite porous separator may be manufactured by a conventional process known to one skilled in the art. One embodiment of a method for manufacturing the organic/inorganic composite porous separator according to the present invention, includes the steps of: (a) dissolving a binder polymer into a solvent to form a polymer solution; (b) adding inorganic particles to the polymer solution obtained from step (a) and mixing them; and (c) coating the mixture obtained from step (b) onto at least one region selected from the group consisting of the surface of a polyolefin-based separator substrate and a part of the pores present in the substrate, followed by drying.

Hereinafter, the method for manufacturing the organic/inorganic composite porous separator according to the present invention will be explained in detail.

(1) First, a binder polymer is dissolved into a suitable organic solvent to provide a polymer solution.

It is preferable that the solvent has a solubility parameter similar to that of the polymer to be used, and a low boiling point, because such solvent facilitates uniform mixing and subsequent removal of the solvent. Non-limiting examples of the solvent that may be used include acetone, tetrahydrofuran, methylene chloride, chloroform, dimethylformamide, N-methyl-2-pyrrolidone, cyclohexane, water or mixtures thereof.

(2) Next, inorganic particles are added to and dispersed in the polymer solution obtained from the preceding step to provide a mixture of inorganic particles with binder polymer.

It is preferable to perform a step of pulverizing inorganic particles after adding the inorganic particles to the binder polymer solution. The time needed for pulverization is suitably 1~20 hours. The particle size of the pulverized particles ranges preferably from 0.001 and 10 µm. Conventional pulverization methods, preferably a method using a ball mill, may be used.

Although there is no particular limitation in the composition of the mixture containing inorganic particles and binder polymer, such composition can contribute to control the thickness, pore size and porosity of the organic/inorganic composite porous separator to be formed finally.

In other words, as the weight ratio (I/P) of the inorganic particles (I) to the polymer (P) increases, porosity of the organic/inorganic composite porous separator according to the present invention increases. Therefore, the thickness of the organic/inorganic composite porous separator increases under the same solid content (weight of the inorganic particles+weight of the binder polymer). Additionally, the pore size increases in proportion to the pore formation among the inorganic particles. As the size (particle diameter) of the inorganic particles increases, interstitial distance among the inorganic particles increases, thereby increasing the pore size.

(3) The mixture of inorganic particles with binder polymer is coated on the polyolefin-based separator substrate, followed by drying to provide the organic/inorganic composite porous separator according to the present invention.

In order to coat the polyolefin-based separator substrate with the mixture of inorganic particles and binder polymer, any methods known to one skilled in the art may be used. It is possible to use various processes including dip coating, die coating, roll coating, comma coating or combinations thereof. Additionally, when the mixture containing inorganic particles and polymer is coated on the polyolefin-based separator substrate, either or both surfaces of the separator substrate may be coated.

The organic/inorganic composite porous separator according to the present invention, obtained as described above, may be used as a separator in an electrochemical device, preferably in a lithium secondary battery. If the binder polymer used in the active layer is a polymer capable of being gelled when swelled with a liquid electrolyte, the polymer may react with the electrolyte injected after assembling a battery by using the separator, and thus be gelled to form a gel type organic/inorganic composite electrolyte.

The gel type organic/inorganic composite electrolyte according to the present invention is prepared with ease compared to gel type polymer electrolytes according to the prior art, and has a large space to be filled with a liquid electrolyte due to its microporous structure, thereby showing excellent ion conductivity and a high degree of swelling with electrolyte, resulting in improvement in the quality of a battery.

Herein, when the organic/inorganic composite porous separator is used as a separator in an electrochemical device, preferably in a lithium secondary battery, lithium conduction can be accomplished through the separator substrate and the porous active layer. In addition to such improved lithium ion conductivity, the electrochemical device can show improved safety as described above, when an internal short circuit occurs due to external impacts.

Further, the present invention provides an electrochemical device comprising: a cathode; an anode; the organic/inorganic composite porous separator according to the present invention, which is interposed between the cathode and anode; and an electrolyte.

Such electrochemical devices include any devices in which electrochemical reactions occur, and particular examples thereof include all kinds of primary batteries, secondary batteries, fuel cells, solar cells or capacitors. Particularly, the electrochemical device is a lithium secondary battery including a lithium metal secondary battery, lithium ion secondary battery, lithium polymer secondary battery or lithium ion polymer secondary battery.

The electrochemical device may be manufactured by a conventional method known to one skilled in the art. In one embodiment of the method for manufacturing the electrochemical device, the electrochemical device is provided by forming an electrode assembly from the organic/inorganic composite porous separator interposed between a cathode and anode, and then by injecting an electrolyte into the assembly.

The electrode that may be applied together with the organic/inorganic composite porous separator according to the present invention may be formed by applying an electrode active material on a current collector according to a method known to one skilled in the art. Particularly, cathode active materials may be any conventional cathode active materials currently used in a cathode of a conventional electrochemical device. Particular non-limiting examples of the cathode active material include lithium intercalation materials such as lithium manganese oxides, lithium cobalt oxides, lithium nickel oxides, or composite oxides thereof. Additionally, anode active materials may be any conventional anode active materials currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Each of the electrode active materials is bonded to the corresponding current collector to provide the corresponding electrode. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof.

More particularly, the electrolyte may be injected in an adequate step during the manufacturing process of an electrochemical device, according to the manufacturing process and desired properties of a final product. In other words, electrolyte may be injected, before an electrochemical device is assembled or in a final step during the assemblage of an electrochemical device.

Processes that may be used for applying the organic/inorganic composite porous separator to a battery include not only a conventional winding process but also a lamination (stacking) and folding process of a separator and electrode.

When the organic/inorganic composite porous separator according to the present invention is applied to a lamination process, there is an advantage in that a battery can be assembled with ease by virtue of excellent adhesion of the polymer present in the organic/inorganic composite porous separator according to the present invention. In this case, the adhesion can be controlled depending on the content of inorganic particles and content and properties of the polymer. More particularly, as the polarity of the polymer increases and as the glass transition temperature (Tg) or melting point (Tm) of the polymer decreases, it is possible to accomplish higher adhesion between the organic/inorganic composite porous separator and electrode.

BEST MODE FOR CARRYING OUT THE INVENTION

Reference will now be made in detail to the preferred embodiments of the present invention. It is to be understood that the following examples are illustrative only and the present invention is not limited thereto.

REFERENCE EXAMPLE

Evaluation for Ion Conductivity of Organic/Inorganic Composite System

The following test was performed in order to determine variations in the ion conductivity of the organic/inorganic composite system according to the present invention, depending on the mixing ratio of inorganic particles and binder polymer.

$BaTiO_3$ and PVdF-CTFE were used as the inorganic particles and the binder polymer, respectively. The mixing ratio (wt % of the inorganic particles:wt % of the binder polymer) was varied from 0:100 to 70:30 to provide organic/inorganic composite porous separators. Then, each separator was swelled with an electrolyte containing 1M lithium hexafluorophosphate ($LiPF_6$) dissolved in ethylene carbonate/propylene carbonate/diethyl carbonate (EC/PC/DEC=30:20:50 wt %). Then, the separator swelled with the electrolyte was measured for the ion conductivity by using the Metrohm 712 instrument. Measurement was carried out at a temperature of 25° C.

Figure 4:
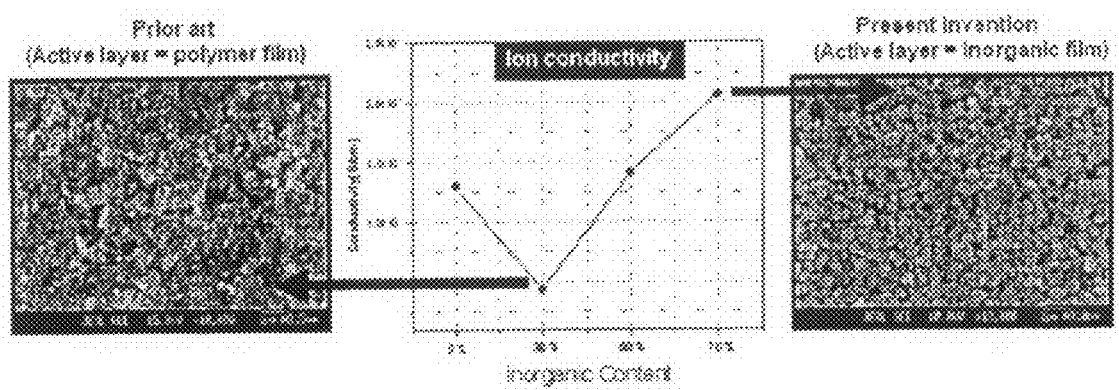
FIG. 4 is a graph showing variations in ion conductivity depending on the mixing ratio of inorganic particles and a binder polymer that form the organic/inorganic composite porous separator according to the present invention.

As shown in FIG. 4, as the content of inorganic particles increases, ion conductivity is improved. Particularly, when the inorganic particles are used in an amount of greater than 50 wt %, ion conductivity is improved significantly.

Therefore, it is thought that the organic/inorganic composite porous separator according to the present invention shows excellent ion conductivity, as compared to a conventional separator that comprises inorganic particles and a polymer, wherein the polymer content is greater than the content of the inorganic particles.

EXAMPLE 1-7

Example 1

1-1. Preparation of Organic/Inorganic Composite Porous Separator (PVdF-CTFE/$BaTiO_3$)

Polyvinylidene fluoride-chlorotrifluoroethylene copolymer (PVdF-CTFE) was added to acetone in an amount of about 5 wt % and dissolved therein at 50° C. for about 12 hours or more to form a polymer solution. To the polymer solution obtained as described above, $BaTiO_3$ powder was added in an amount corresponding to the ratio of $BaTiO_3$/PVdF-CTFE=90/10 (wt % ratio). Next, the $BaTiO_3$ powder was crushed and pulverized for about 12 hours or more by using a ball mill method to form slurry. The $BaTiO_3$ powder in the slurry obtained as described above has a size controllable according to the size (particle size) of the beads used in the ball mill and the application time of the ball mill. In this example, the $BaTiO_3$ powder was pulverized into a size of about 400 nm to provide the slurry. Then, the slurry obtained as described above was coated on a polyethylene separator (porosity: 45%) having a thickness of about 18 μm by using a dip coating process to a coating layer thickness of about 3 μm. After measuring with a porosimeter, the active layer coated on the polyethylene separator had a pore size of 0.5 μm and a porosity of 58%. FIG. 1 shows the structure of the active layer.

1-2. Manufacture of Lithium Secondary Battery (Manufacture of Cathode)

To N-methyl-2-pyrrolidone (NMP) as a solvent, 94 wt % of $LiCoO_2$ as a cathode active material, 3 wt % of carbon black as a conductive agent and 3 wt % of PVDF as a binder were added to form slurry for a cathode. The slurry was coated on Al foil having a thickness of about 20 μm as a cathode collector, and then dried to form a cathode. Then, the cathode was subjected to roll press.

(Manufacture of Anode)

To N-methyl-2-pyrrolidone (NMP) as a solvent, 96 wt % of carbon powder as an anode active material, 3 wt % of PVDF as a binder and 1 wt % of carbon black as a conductive agent were added to form mixed slurry for an anode. The slurry was coated on Cu foil having a thickness of about 10 μm as an anode collector, and then dried to form an anode. Then, the anode was subjected to roll press.

(Manufacture of Battery)

The cathode and the anode obtained as described above were assembled with the organic/inorganic composite porous separator obtained as described in Example 1-1 by way of a stack & folding process to form an electrode assembly. Then, an electrolyte (ethylene carbonate (EC)/ethylmethyl carbonate (EMC)=1:2 (volume ratio) containing 1M of lithium hexafluorophosphate ($LiPF_6$)) was injected to the assembly to provide a lithium secondary battery.

Example 2

Example 1 was repeated to provide an organic/inorganic composite porous separator (PVdF-HFP/$BaTiO_3$) and a lithium secondary battery comprising the same, except that PVDF-HFP was used instead of PVDF-CTFE. After measuring with a porosimeter, the final organic/inorganic composite porous separator had a thickness of 3 μm, and showed a pore size of 0.4 μm and a porosity of 56%.

Example 3

Example 1 was repeated to provide an organic/inorganic composite porous separator (PVdF-CTFE/PMNPT) and a lithium secondary battery comprising the same, except that PMNPT powder was used instead of $BaTiO_3$ powder. After measuring with a porosimeter, the final organic/inorganic composite porous separator had a thickness of 3 μm and showed a pore size of 0.5 μm and a porosity of 57%.

Example 4

Example 1 was repeated to provide an organic/inorganic composite porous separator (PVdF-CTFE/$BaTiO_3$—$Al_2O_3$) and a lithium secondary battery comprising the same, except that mixed powder of $BaTiO_3$ and $Al_2O_3$ (weight ratio=90:10) was used instead of $BaTiO_3$ powder. After measuring with a porosimeter, the final organic/inorganic composite porous separator had a thickness of 3 μm, and showed a pore size of 0.4 μm and a porosity of 56%.

Example 5

Example 1 was repeated to provide an organic/inorganic composite porous separator (PVDF-CTFE/$LiTi_2(PO_4)_3$) and a lithium secondary battery comprising the same, except that $LiTi_2(PO_4)_3$ powder was used instead of $BaTiO_3$ powder and the $LiTi_2(PO_4)_3$ powder was pulverized into a particle diameter of about 500 nm to form slurry. After measuring with a porosimeter, the active layer coated on the polyethylene separator had a pore size of 0.5 µm and a porosity of 58%.

Example 6

Example 1 was repeated to provide an organic/inorganic composite porous separator (PVdF-HFP/$LiTi_2(PO_4)_3$) and a lithium secondary battery comprising the same, except that neither $BaTiO_3$ powder nor PVDF-CTFE was used, and $LiTi_2(PO_4)_3$ powder and PVDF-HFP were used, and the $LiTi_2(PO_4)_3$ powder was pulverized into a particle diameter of about 500 nm to form slurry. After measuring with a porosimeter, the final organic/inorganic composite porous separator had a thickness of 3 µm and showed a pore size of 0.4 µm and a porosity of 56%.

Example 7

Example 1 was repeated to provide an organic/inorganic composite porous separator (PVdF-CTFE/$LiTi_2(PO_4)_3$—$BaTiO_3$) and a lithium secondary battery comprising the same, except that mixed powder of $LiTi_2(PO_4)_3$/$BaTiO_3$ (weight ratio=50:50) was used instead of $BaTiO_3$ powder. After measuring with a porosimeter, the final organic/inorganic composite porous separator had a thickness of 3 µm, and showed a pore size of 0.4 µm and a porosity of 57%.

COMPARATIVE EXAMPLES 1-2

Comparative Example 1

Example 1 was repeated to provide a lithium secondary battery, except that a polyethylene (PE) separator was used.

Comparative Example 2

Example 1 was repeated to provide a composite film and a lithium secondary battery comprising the same, except that PVDF-CTFE and the inorganic particles ($BaTiO_3$) were used in a weight ratio of 70/30.

Experimental Example 1. Surface Analysis of Organic/Inorganic Composite Porous Separator The following test was performed to analyze the surface of the organic/inorganic composite porous separator according to the present invention.

The sample used in this test was the organic/inorganic composite porous separator (PVdF-CTFE/$BaTiO_3$) according to Example 1, which is obtained by coating the mixture of the inorganic particles and the polymer onto a polyethylene separator.

When analyzed by using a Scanning Electron Microscope (SEM), the organic/inorganic composite porous separator according to the present invention showed uniform pore structures formed in the polyethylene separator substrate itself (see FIG. 2b) as well as in the active layer, into which the inorganic particles are incorporated (see FIG. 2a).

Experimental Example 2. Evaluation for Heat Shrinkage of Organic/Inorganic Composite Porous Separator The following experiment was performed to compare the organic/inorganic composite porous separator according to the present invention with a conventional separator.

The organic/inorganic composite porous separators according to Examples 1 to 7 were used as samples. As a control, a PE separator was used.

Each of the test samples was checked for its heat shrinkage after stored at a high temperature of 150° C. for 1 hour. The test samples provided different results after 1 hour at 150° C. The PE separator as a control was shrunk due to high temperature to leave only the outer shape thereof (see FIG. 5a). On the contrary, the organic/inorganic composite porous separators according to the present invention showed good results with no heat shrinkage (see, FIG. 5b).

Experimental Example 3. Evaluation for Safety of Organic/Inorganic Composite Porous Separator The following test was performed to evaluate the safety of the organic/inorganic composite porous separator according to the present invention, compared to a conventional separator.

The organic/inorganic composite porous separators according to Examples 1 to 7 were used as samples. As a control, a PE separator was used.

Generally, when an internal short circuit occurs in a battery due to external or internal factors, the separator used in the battery is broken to cause a direct contact between a cathode and an anode, rapid heat emission and extension of the region of short circuit, resulting in degradation in the battery safety. In this example, a pseudo internal short circuit test was performed to evaluate the safety of a battery upon an internal short circuit.

Figure 6:
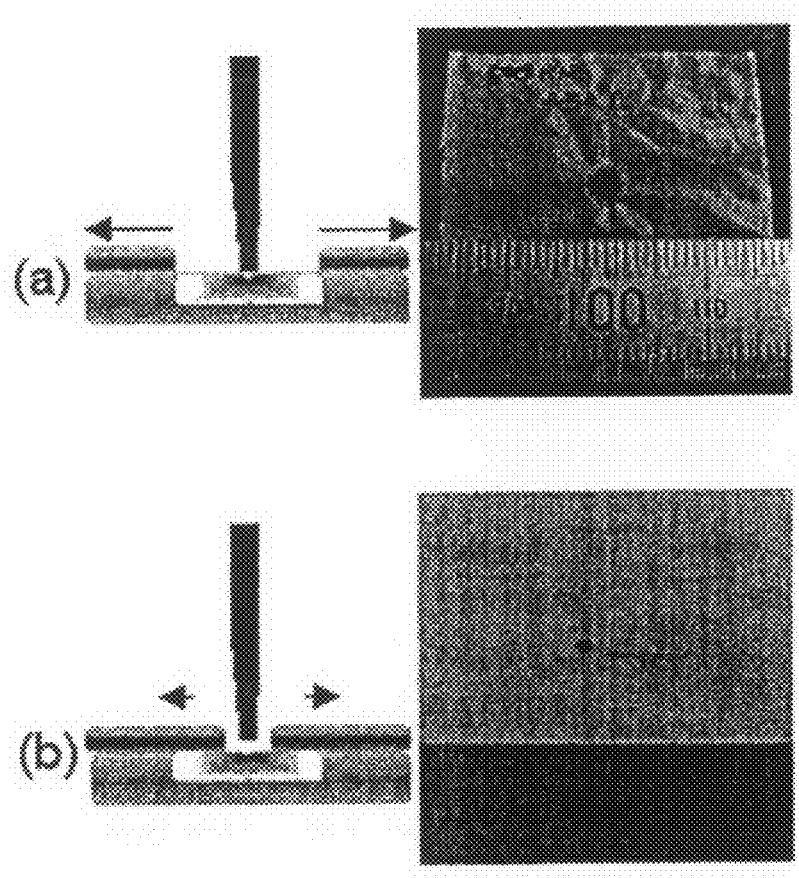

A predetermined region of the separator was broken by using a needle-like nail heated to about 450° C. to cause an artificial internal short circuit. The PE separator according to Comparative Example 1 showed significant extension of the region of the separator, broken by the nail (see FIG. 6a). This indicates that there is a great possibility of an internal short circuit in a battery. On the contrary, in the organic/inorganic composite porous separator according to the present invention, the broken region of the separator was significantly inhibited from being extended (see FIG. 6b). This demonstrates that the organic/inorganic composite porous active layer prevents a complete short circuit between a cathode and an anode even if the separator is broken in a battery. Further, if a short circuit occurs, the organic/inorganic composite porous separator inhibits extension of the region of short circuit, and thus contributes to improve the safety of a battery.

Experimental Example 4. Evaluation for Safety Against Internal Short Circuit of Lithium Secondary Battery The following test was performed to evaluate the safety of the lithium secondary battery comprising the organic/inorganic composite porous separator according to the present invention against an internal short circuit.

A local crush test was performed by using the lithium secondary battery according to Example 1 as a sample, and the battery according to Comparative Example 1 comprising the conventional PE separator as a control.

In the so-called local crush test, a coin with a diameter of 1 cm was positioned on a battery, and compressed at a constant speed to cause an artificial internal short circuit by the direct contact between a cathode and an anode. Then, the battery is observed whether it explodes or not.

Figure 7:
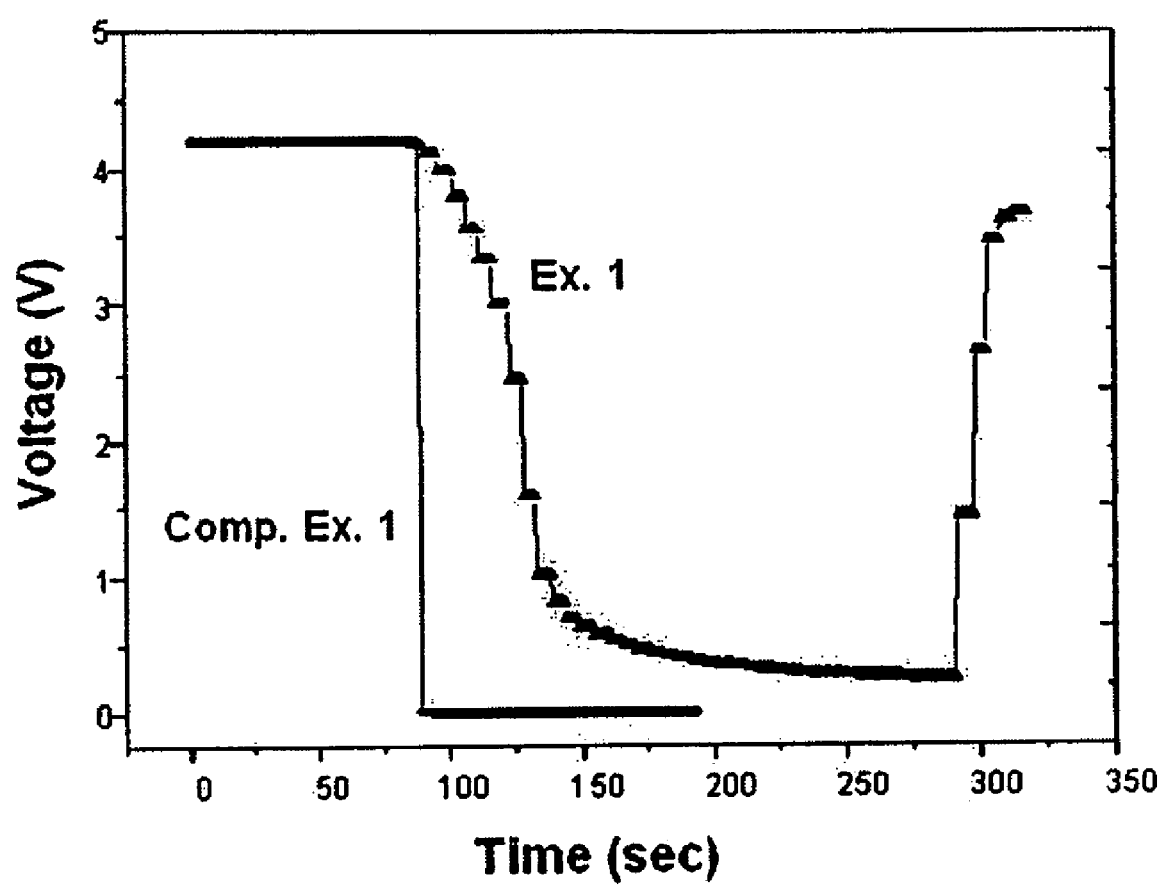
FIG. 7 is a graph showing variations in voltage of each of the lithium secondary batteries including the organic/inorganic composite porous separator (PVdF-CTFE/$BaTiO_3$) according to Example 1 and the currently used PE separator according to Comparative Example 1, after local crush that causes an artificial internal short circuit.
Figure 8:
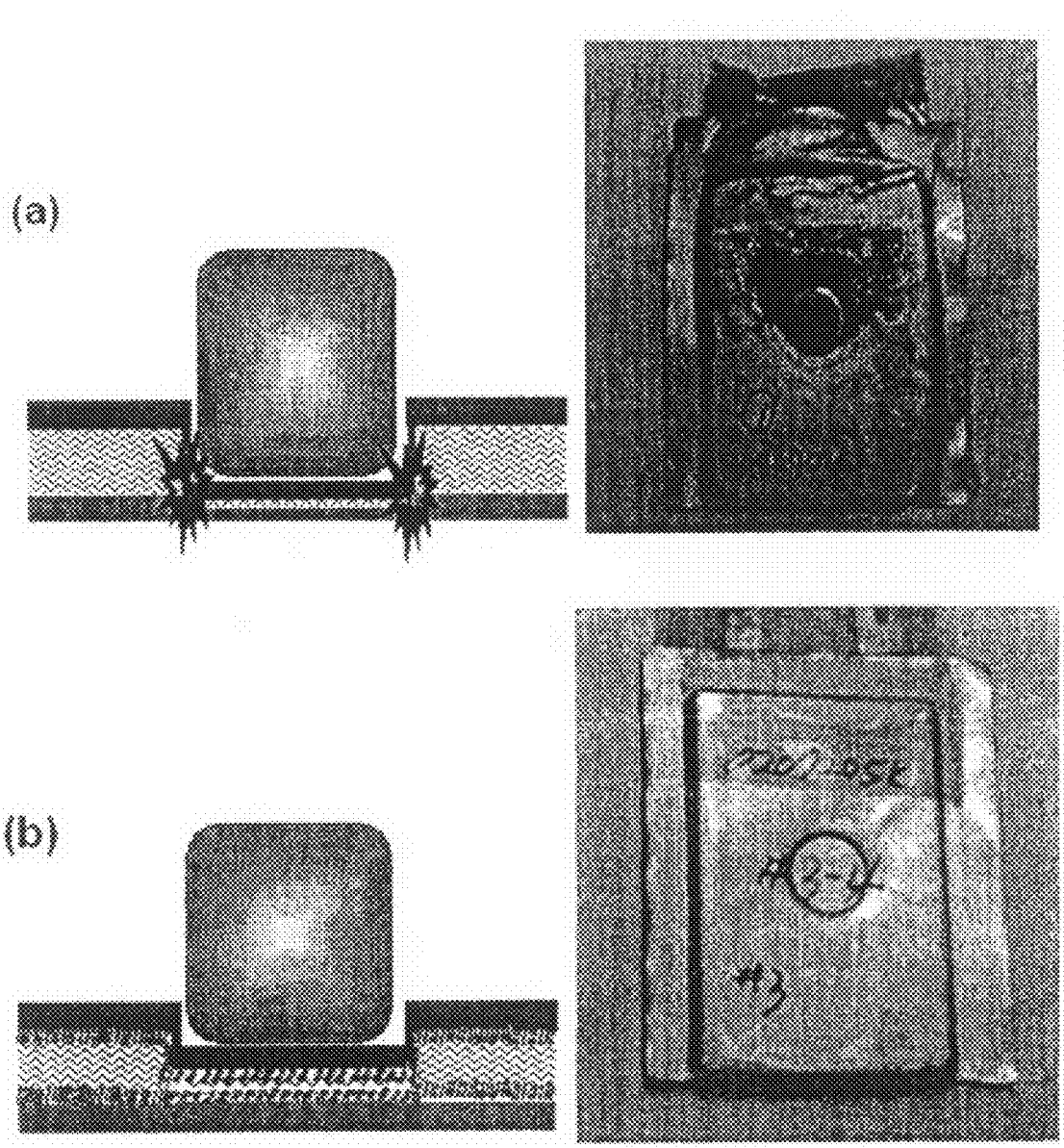

After the test, in the battery according to Comparative Example 1 using the conventional polyolefin-based separator, the separator exploded immediately by the internal short circuit of the battery (see FIG. 8a), and showed a rapid drop in the voltage to zero (0) (see FIG. 7).

On the contrary, the battery according to Example 1 using the organic/inorganic composite porous separator caused no explosion (see FIG. 8b), and showed a slow drop in the voltage (see FIG. 7). This indicates that the inorganic particles used in the organic/inorganic composite porous separator prevents a complete internal short circuit even if the separator is broken by external impacts, and piezoelectricity of the inorganic particles permits a minute flow of electric current between a cathode and an anode, and thus contributes to improve the safety of a battery by virtue of a slow drop in the voltage of a battery.

Therefore, it can be seen from the above results that the lithium secondary battery comprising the organic/inorganic composite porous separator according to the present invention has excellent safety.

Experimental Example 5. Evaluation for Overcharge Safety of Lithium Secondary Battery The following test was performed to evaluate the overcharge safety of the lithium secondary battery comprising the organic/inorganic composite porous separator according to the present invention.

The following overcharge test was carried out by using the lithium secondary battery according to Example 1 as a sample, and the battery according to Comparative Example 1 using the conventional PE separator as a control.

In the overcharge test, a battery was evaluated whether it explodes or not under a predetermined overvoltage and overcurrent.

Figure 9:
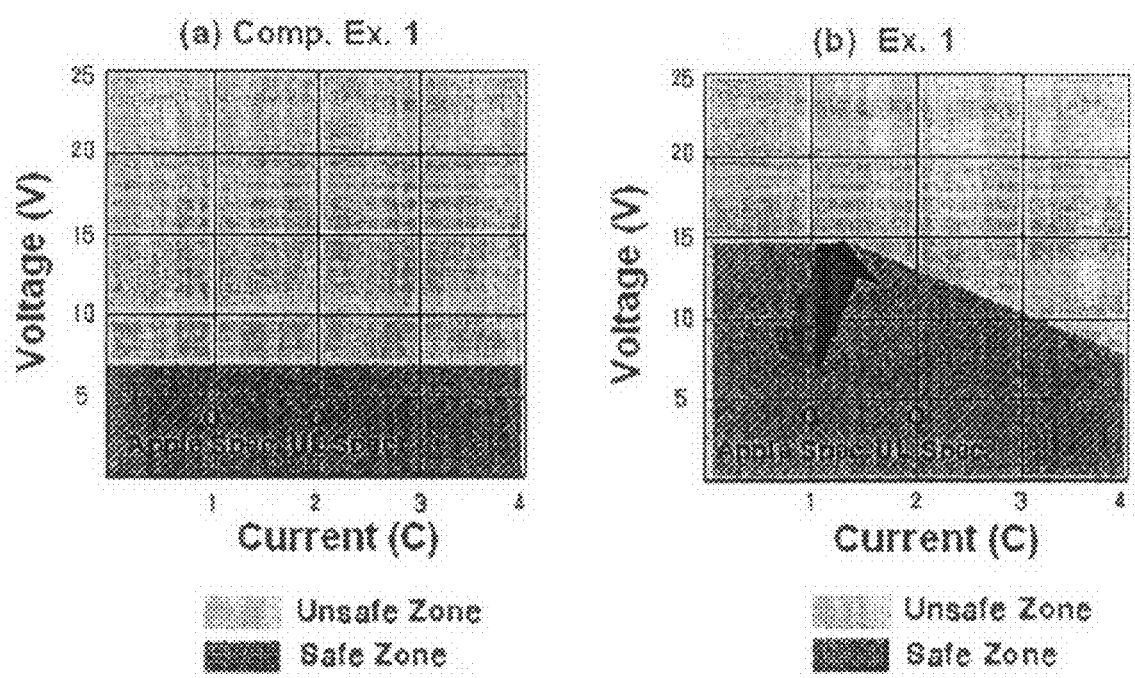

After the test, the battery according to Comparative Example 1 showed a very small safety zone upon overcharge (see FIG. 9a), while the battery according to Example 1 showed a significantly extended safety zone upon overcharge (see FIG. 9b). This indicates that the organic/inorganic composite porous separator according to the present invention has excellent thermal properties.

Experimental Example 6. Evaluation for Quality of Lithium Secondary Battery

The following test was performed in order to evaluate C-rate characteristics of the lithium secondary battery comprising the organic/inorganic composite porous separator according to the present invention.

The lithium secondary batteries according to Examples 1-7 were used as samples. As controls, used were the battery using the conventional PE separator according to Comparative Example 1, and the battery using the composite film comprising PVdF-CTFE/BaTiO$_3$ (weight ratio=30:70 on the wt % basis) as a separator according to Comparative Example 2. Each battery having a capacity of 760 mAh was subjected to cycling at a discharge rate of 0.5 C, 1 C and 2 C. The following Table 3 shows the discharge capacity of each battery, the capacity being expressed on the basis of C-rate characteristics.

After the test, lithium secondary batteries comprising the organic/inorganic composite porous separators according to Examples 1 to 7 showed C-rate characteristics comparable to those of the battery using a conventional polyolefin-based separator under a discharge rate of up to 2 C. However, the battery comprising the composite separator with a higher content of polymer according to Comparative Example 2 shows a significant drop in the capacity as the discharge rate increases. This indicates that the battery according to Comparative Example 2 has poor quality (see, Table 1).

TABLE 1

| Battery | Discharge Rate | | |
| --- | --- | --- | --- |
| | 0.5 C | 1 C | 2 C |
| Ex. 1 | 756 | 744 | 692 |
| Ex. 2 | 755 | 746 | 693 |
| Ex. 3 | 753 | 742 | 690 |
| Ex. 4 | 754 | 745 | 691 |
| Ex. 5 | 753 | 742 | 694 |
| Ex. 6 | 754 | 744 | 690 |
| Ex. 7 | 756 | 745 | 692 |
| Comp. Ex. 1 | 755 | 746 | 693 |
| Comp. Ex. 2 | 736 | 688 | 538 |

INDUSTRIAL APPLICABILITY

As can be seen from the foregoing, the organic/inorganic composite porous separator according to the present invention has an active layer comprising inorganic particles and a binder polymer, which is coated on a polyolefin-based separator substrate having pores. In the active layer, the inorganic particles are interconnected among themselves and fixed by the binder polymer, and interstitial volumes among the inorganic particles form a heat resistant microporous structure. Therefore, the organic/inorganic composite porous separator according to the present invention contributes to improve the thermal safety, electrochemical safety and quality of a battery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An organic/inorganic composite porous separator, which comprises:
   (a) a polyolefin-based separator substrate; and
   (b) an active layer formed by coating at least one region selected from the group consisting of a surface of the substrate and a part of pores present in the substrate with a mixture of inorganic particles and a binder polymer, wherein the inorganic particles in the active layer are interconnected among themselves and are fixed by the binder polymer, and interstitial volumes among the inorganic particles form a pore structure, and
   the inorganic particles have a size between 0.001 µm and 10 µm and are present in the mixture of inorganic particles with the binder polymer in an amount of 50-99 wt % based on 100 wt % of the mixture, and
   wherein the separator has uniform pore structures both in the active layer and the polyolefin-based separator substrate.

2. The separator according to claim 1, wherein the inorganic particles are at least one selected from the group consisting of: (a) inorganic particles having a dielectric constant of 5 or more; (b) inorganic particles having piezoelectricity; and (c) inorganic particles having lithium ion conductivity.

3. The separator according to claim 2, wherein the inorganic particles (b) having piezoelectricity cause an electric potential difference due to positive charges and negative charges generated on both surfaces upon application of a certain pressure.

4. The separator according to claim 2, wherein the inorganic particles (c) having lithium ion conductivity are inorganic particles containing lithium elements and having a capability of conducting lithium ions without storing lithium.

5. The separator according to claim 2, wherein the inorganic particles (a) having a dielectric constant of 5 or more are $SrTiO_3$, $SnO_2$, $CeO_2$, $MgO$, $NiO$, $CaO$, $ZnO$, $ZrO_2$, $Y_2O_3$, $Al_2O_3$, $TiO_2$ or SiC; the inorganic particles (b) having piezoelectricity are $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT) or hafnia ($HfO_2$); and the inorganic particles (c) having lithium ion conductivity are at least one selected from the group consisting of: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides($Li_xN_y$, $0<x<4$, $0<y<2$), $SiS_2$ type glass ($Li_xSi_yS_z$, $0<x<3$, $0<y<2$, $0<z<4$) and $P_2S_5$ type glass ($Li_xP_yS_z$, $0<x<3$, $0<y<3$, $0<z<7$).

6. The separator according to claim 1, wherein the binder polymer has a solubility parameter between 15 and 45 $MPa^{1/2}$.

7. The separator according to claim 1, wherein the binder polymer has a dielectric constant between 1.0 and 100 (as measured at a frequency of 1 kHz).

8. The separator according to claim 1, wherein the binder polymer is at least one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, and polyvinyl alcohol.

9. The separator according to claim 1, wherein the polyolefin-based separator substrate comprises at least one component selected from the group consisting of high density polyethylene, low density polyethylene, linear low density polyethylene, ultrahigh molecular weight polyethylene and polypropylene.

10. The separator according to claim 1, which has a thickness between 1 and 100 μm.

11. The separator according to claim 1, which has a pore size between 0.001 and 10 μm, and a porosity between 5% and 95%.

12. An electrochemical device comprising a cathode, an anode, the organic/inorganic composite porous separator as claimed in claim 1, and an electrolyte, wherein, the organic/inorganic composite porous separator comprises:

(a) a polyolefin-based separator substrate; and
(b) an active layer formed by coating at least one region selected from the group consisting of a surface of the substrate and a part of pores present in the substrate with a mixture of inorganic particles and a binder polymer, wherein the inorganic particles in the active layer are interconnected among themselves and are fixed by the binder polymer, and interstitial volumes among the inorganic particles form a pore structure, and
the inorganic particles have a size between 0.001 μm and 10 μm and are present in the mixture of inorganic particles with the binder polymer in an amount of 50-99 wt % based on 100 wt % of the mixture, and
wherein the separator has uniform pore structures both in the active layer and the polyolefin-based separator substrate.

13. The electrochemical device according to claim 12, wherein the binder polymer has a solubility parameter between 15 and 45 $Mpa^{1/2}$.

14. The electrochemical device according to claim 12, which is a lithium secondary battery.

15. The electrochemical device according to claim 12, wherein the inorganic particles are at least one selected from the group consisting of: (a) inorganic particles having a dielectric constant of 5 or more; (b) inorganic particles having piezoelectricity; and (c) inorganic particles having lithium ion conductivity.

16. The electrochemical device according to claim 15, wherein the inorganic particles (b) having piezoelectricity cause an electric potential difference due to positive charges and negative charges generated on both surfaces upon application of a certain pressure.

17. The electrochemical device according to claim 15, wherein the inorganic particles (c) having lithium ion conductivity are inorganic particles containing lithium elements and having a capability of conducting lithium ions without storing lithium.

18. A method for manufacturing an organic/inorganic composite porous separator as defined in claim 1, which comprises the steps of:

(a) dissolving a binder polymer into a solvent to form a polymer solution;
(b) adding inorganic particles having a size of between 0.01 μm and 10 μm to the polymer solution obtained from step (a) and mixing them, wherein the inorganic particles are present in the mixture of inorganic particles with the binder polymer in an amount of 50-99 wt % based on 100 wt % of the mixture; and
(c) coating the mixture obtained from step (b) on at least one region selected from the group consisting of a surface of a polyolefin-based separator substrate and a part of pores present in the substrate, followed by drying.

\* \* \* \* \*